(12) United States Patent
Tsuji et al.

(10) Patent No.: US 7,371,061 B2
(45) Date of Patent: May 13, 2008

(54) DIE CLAMPING SYSTEM

(75) Inventors: Makoto Tsuji, Kanagawa (JP); Toshiaki Toyoshima, Kanagawa (JP); Saburo Noda, Kanagawa (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 60 days.

(21) Appl. No.: 11/518,883

(22) Filed: Sep. 12, 2006

(65) Prior Publication Data

US 2007/0065534 A1    Mar. 22, 2007

(30) Foreign Application Priority Data

Sep. 14, 2005    (JP)    ............................ P2005-266501

(51) Int. Cl.
*B29C 45/17*    (2006.01)

(52) U.S. Cl. ...................... 425/190; 164/341; 164/342; 425/589; 425/595

(58) Field of Classification Search ................. 425/190, 425/192 R, 589, 595; 164/341, 342
See application file for complete search history.

(56) References Cited

U.S. PATENT DOCUMENTS

| | | | |
|---|---|---|---|
| 3,465,387 A * | 9/1969 | Allard et al. ............... | 425/590 |
| 3,882,588 A * | 5/1975 | McFalls et al. ............. | 425/190 |
| 3,951,579 A * | 4/1976 | Myers et al. ................ | 425/190 |
| 4,025,264 A * | 5/1977 | Hehl ........................... | 425/190 |
| 5,017,120 A * | 5/1991 | Holzinger et al. .......... | 425/190 |
| 5,417,913 A * | 5/1995 | Arend ......................... | 425/589 |
| 5,542,465 A * | 8/1996 | Wolniak ..................... | 164/341 |
| 6,120,722 A * | 9/2000 | Schad ......................... | 425/190 |
| 2003/0217829 A1* | 11/2003 | Baron et al. ................ | 164/341 |

FOREIGN PATENT DOCUMENTS

| | | |
|---|---|---|
| JP | U2574639 | 4/1998 |
| JP | 2003-334648 | 11/2003 |
| JP | 2005-144802 | 6/2005 |

* cited by examiner

*Primary Examiner*—James P. Mackey
(74) *Attorney, Agent, or Firm*—DLA Piper US LLP (57) ABSTRACT

A die clamping system enabling reduction of the size of a tie bar withdrawing mechanism, that is, a die clamping system provided with a fixed die plate, a moveable die plate, tie bars withdrawable from the fixed die plate, moveable parts engaging with the tie bars, withdrawal cylinders moving the moveable parts provided in the moveable die plate in a withdrawing direction, and a hook system engaging the moveable parts and the tie bars. When a second coupled part and a second coupling part are coupled, a drive mechanism moves said moveable die plate to a die opening direction and afterwards releases the coupling of the second coupled part and the second coupling part. When a coupling is formed by the hook system, the withdrawal cylinders move the moveable parts to a withdrawing direction.

8 Claims, 8 Drawing Sheets

DIE CLAMPING SYSTEM

BACKGROUND OF THE INVENTION

1. Field of the Invention

The present invention relates to a die clamping system used in a die cast machine, molding machine, etc., more particularly relates to a die clamping system wherein tie bars are withdrawable.

2. Description of the Related Art

To facilitate the exchange of dies, a die clamping system having withdrawable tie bars hung between a moveable die plate and fixed die plate is known. Japanese Patent Publication (A) No. 2003-334648 disclose a die clamping system having withdrawal cylinders provided at the moveable die plate and withdrawing the tie bars. The piston rods of the withdrawal cylinders are fixed to the tie bars. In this die clamping system, when the moveable die plate is in a die opening position, moving the tie bars to the moveable die plate side by the withdrawal cylinders causes the tie bars to be withdrawn from the fixed die plate. Japanese Patent Publication (A) No. 2005-144802 discloses a technique using withdrawal cylinders the same as those of Japanese Patent Publication (A) No. 2003-334648 as die opening and closing cylinders. Japanese Utility Model Registration No. 2574639 discloses a die clamping system providing the withdrawal cylinders moveable in the withdrawing direction of the tie bars with respect to a link housing and engagement members engaging the link housing and the withdrawal cylinders with each other. By repeatedly alternately operating the withdrawal cylinders and operating the engagement members, it is possible to split the movement of the tie bars by the withdrawal cylinders into two operations and thus make the strokes of the withdrawal cylinders smaller than the amounts of movement of the tie bars during withdrawal.

In the techniques of Japanese Patent Publication (A) No. 2003-334648 and Japanese Patent Publication (A) No. 2005-144802, the tie bars are withdrawn only by the withdrawal cylinders, therefore the withdrawal cylinders require strokes equivalent to the amounts of movement of the tie bars during withdrawal—forcing the withdrawal cylinders to be made large. In the technique of Japanese Utility Model Registration No. 2574639, it is necessary for the withdrawal cylinders to be provided moveable with respect to the die clamping system, causing the configuration to be complicated.

SUMMARY OF THE INVENTION

An object of the present invention is therefore to provide a die clamping system enabling the tie bar withdrawing mechanism to be made small.

According to a first aspect of the invention, there is provided a die clamping system including: a fixed die plate, a moveable die plate moveable in an opening and closing direction with respect to the fixed die plate, a tie bar inserted into the fixed die plate and the moveable die plate and able to be withdrawn from the fixed die plate, a die opening and closing part moving the moveable die plate in the opening and closing direction, a withdrawing part having a moveable part capable of being coupled with the tie bar, provided on the moveable die plate, and moving the moveable part with respect to the moveable die plate in the withdrawing direction of the tie bar, and a withdrawing coupling part coupling the moveable part and the tie bar and releasing the coupling action, the withdrawing coupling part can couple the moveable part and the tie bar when the tie bar is not withdrawn from the fixed die plate, the moveable part is at the limit position of the insertion direction side of the tie bar in the range of movement of the moveable part, and the moveable die plate is at a position at the die closing direction side from the limit position of the die opening direction side of the range of movement of the moveable die plate.

Preferably, the withdrawing coupling part can couple the moveable part and the tie bar when the tie bar is not withdrawn from the fixed die plate, the moveable part is at the limit position of the insertion direction of the tie bar in the range of movement of the moveable part, and the moveable die plate is at the limit position of the die closing direction in the range of movement of the moveable die plate.

Preferably, the withdrawing coupling part engages an end part of the tie bar protruding in the withdrawing direction side from the moveable die plate with the moveable part and releases the coupling action.

According to a second aspect of the invention, there is provided a die clamping system including: a fixed die plate, a moveable die plate moveable in an opening and closing direction with respect to the fixed die plate, a tie bar inserted into the fixed die plate and the moveable die plate and able to be withdrawn from the fixed die plate, a die opening and closing part moving the moveable die plate to the opening and closing direction, a withdrawing part including a moveable part capable of being coupled with the tie bar, provided on the moveable die plate, and moving the moveable part with respect to the moveable die plate in the withdrawing direction of the tie bar, a withdrawing coupling part coupling the moveable part and the tie bar and releasing the coupling action, and a control part controlling operations of the withdrawing coupling part, the die opening and closing part, and the withdrawing part so that in the state of coupling through the withdrawing coupling part, the die opening and closing part moves the moveable die plate in the die opening direction and the withdrawing part moves the tie bars in the withdrawing direction.

According to a third aspect of the invention, there is provided a die clamping system including with a fixed die plate, a moveable die plate moveable in an opening and closing direction with respect to the fixed die plate, a tie bar inserted into the fixed die plate and the moveable die plate and able to be withdrawn from the fixed die plate, a moveable die plate coupling part coupling said moveable die plate and said tie bar and releasing the coupling action, a die opening and closing part moving the moveable die plate to the opening and closing direction, a withdrawing part having a moveable part capable of being coupled with the tie bar and moving the moveable part in the withdrawing direction of the tie bar, a withdrawing coupling part coupling said moveable part and said tie bar and releasing the coupling action, and a control part controlling operations of the moveable die plate coupling part, the withdrawing coupling part, the die opening and closing part, and the withdrawing part so that in the state of coupling by the moveable die plate coupling part, the die opening and closing part moves the moveable die plate in the die opening direction, and then, in the state of releasing the coupling action by the moveable die plate coupling part and coupling by the withdrawing coupling part, the withdrawing part moves the moveable part in the withdrawing direction.

Preferably, the withdrawing part is provided at the moveable die plate.

Preferably, the withdrawing part is a cylinder device having a piston coupled with the moveable part and a cylinder part housing the piston to be moveable in the withdrawing direction of the tie bar.

Preferably, the withdrawing coupling part has a coupled part provided with coupled grooves opening in a direction perpendicular to the withdrawing direction of the tie bar and a coupling part having a plate member arranged so as to be perpendicular to the withdrawing direction of the tie bar and insertable in the coupled grooves and a plate driver inserting and ejecting the plate member to and from the coupled grooves.

According to the present invention, it is possible to reduce the size of the tie bar withdrawing system of a die clamping system.

BRIEF DESCRIPTION OF THE DRAWINGS

These and other objects and features of the present invention will become clearer from the following description of the preferred embodiments given with reference to the attached drawings, wherein.

DESCRIPTION OF THE PREFERRED EMBODIMENTS

Preferred embodiments of the present invention will be described in detail below while referring to the attached figures.

Figure 1:
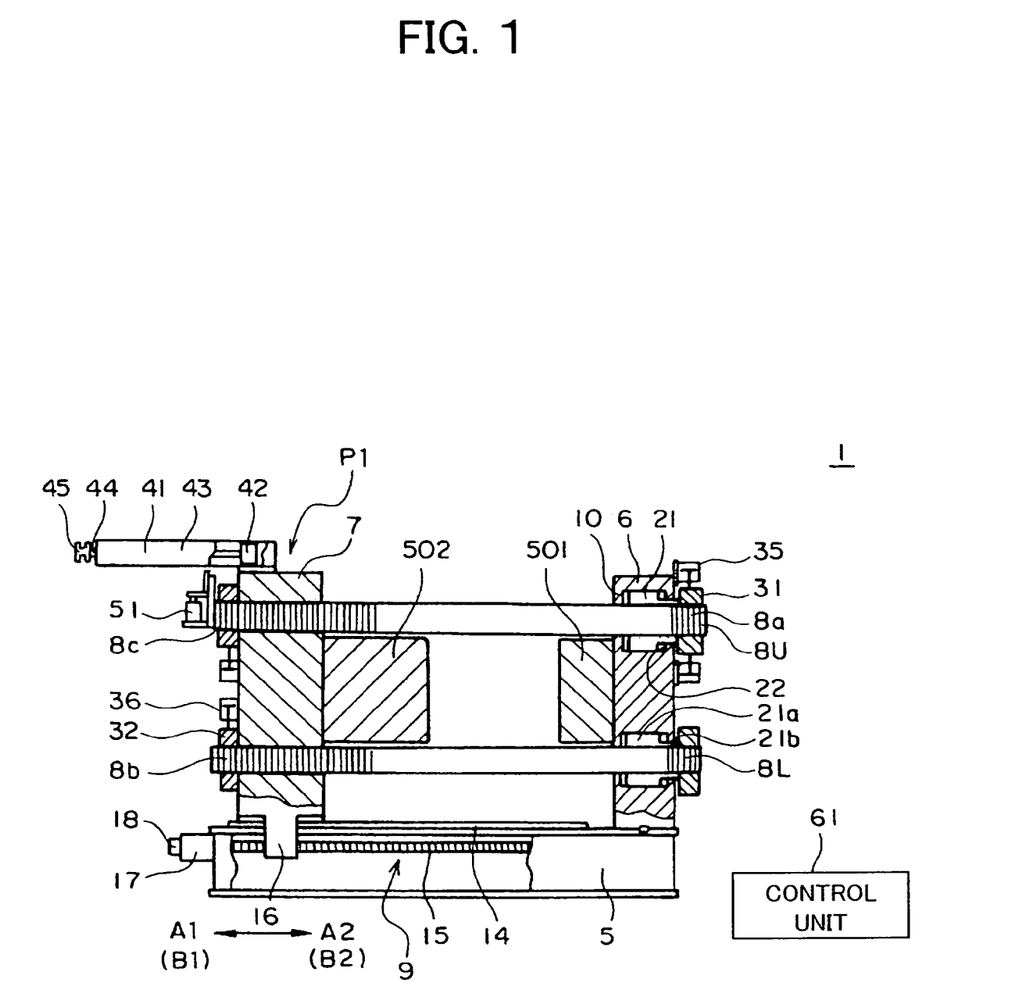
FIG. 1 is a sectional view showing a die clamping system of an embodiment of the present invention in the die opening state.
Figure 2:
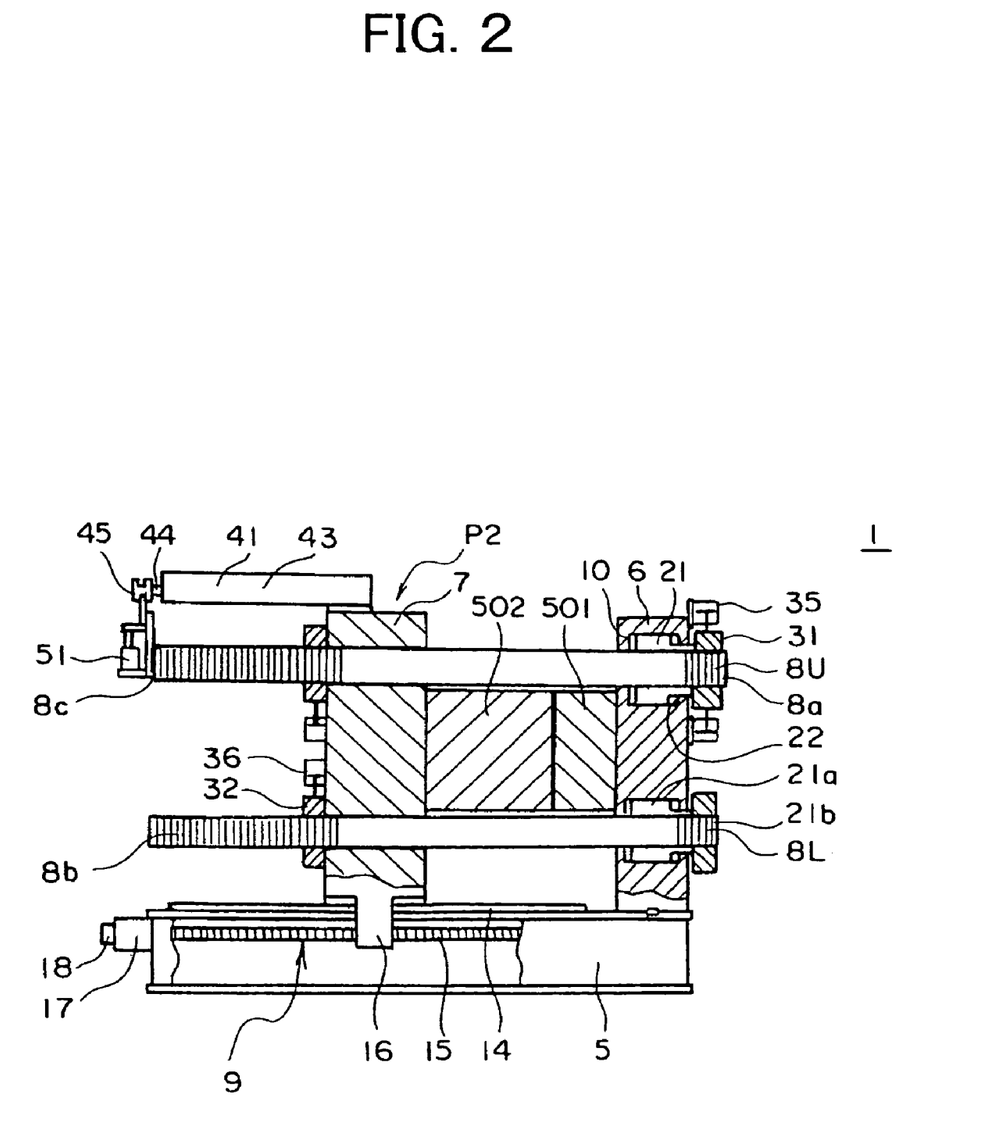
FIG. 2 is a sectional view showing the die clamping system in a die closing state.
Figure 3:
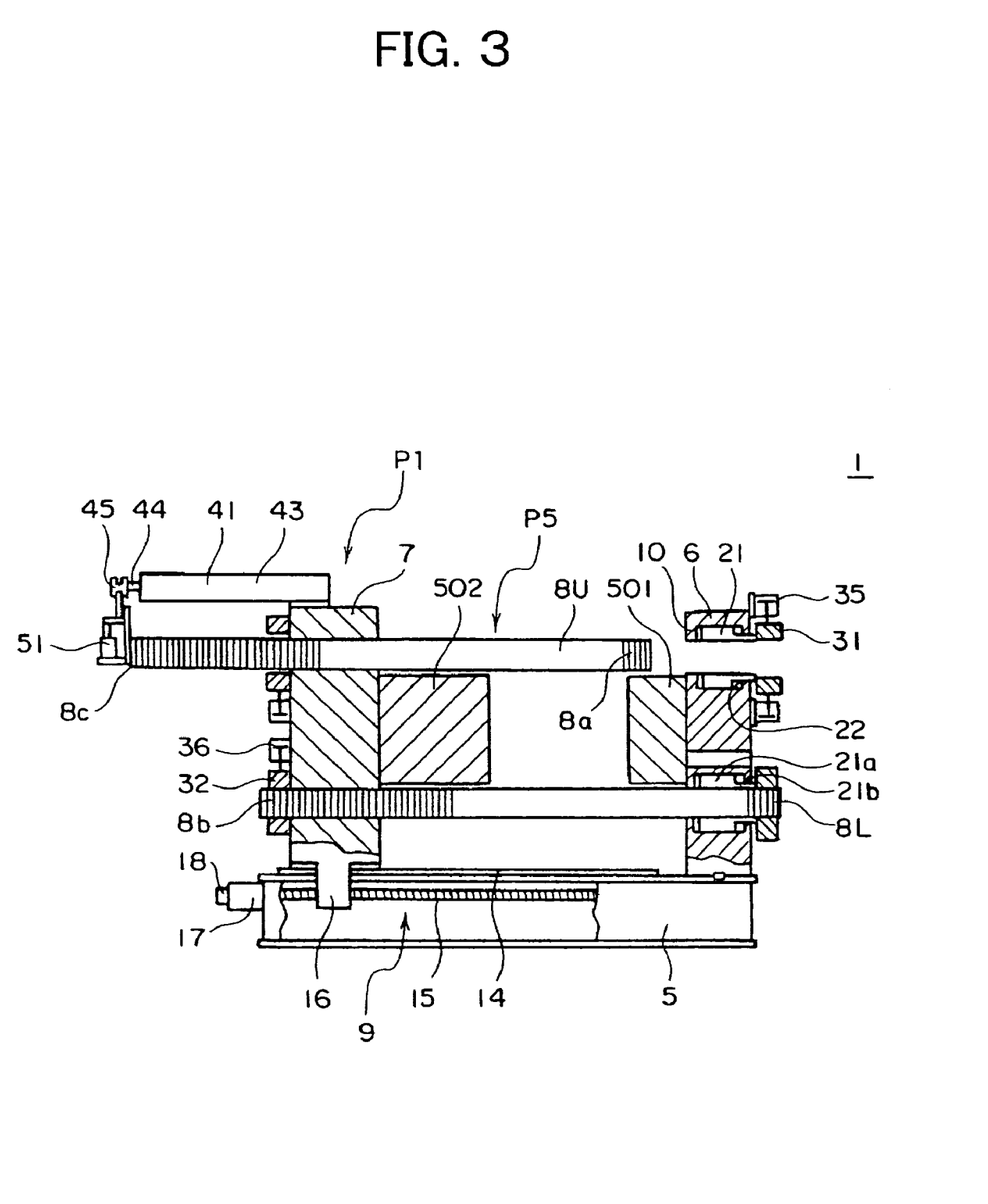
FIG. 3 is a sectional view showing the die clamping system of FIG. 1 during the withdrawal of a tie bar.
Figure 4:
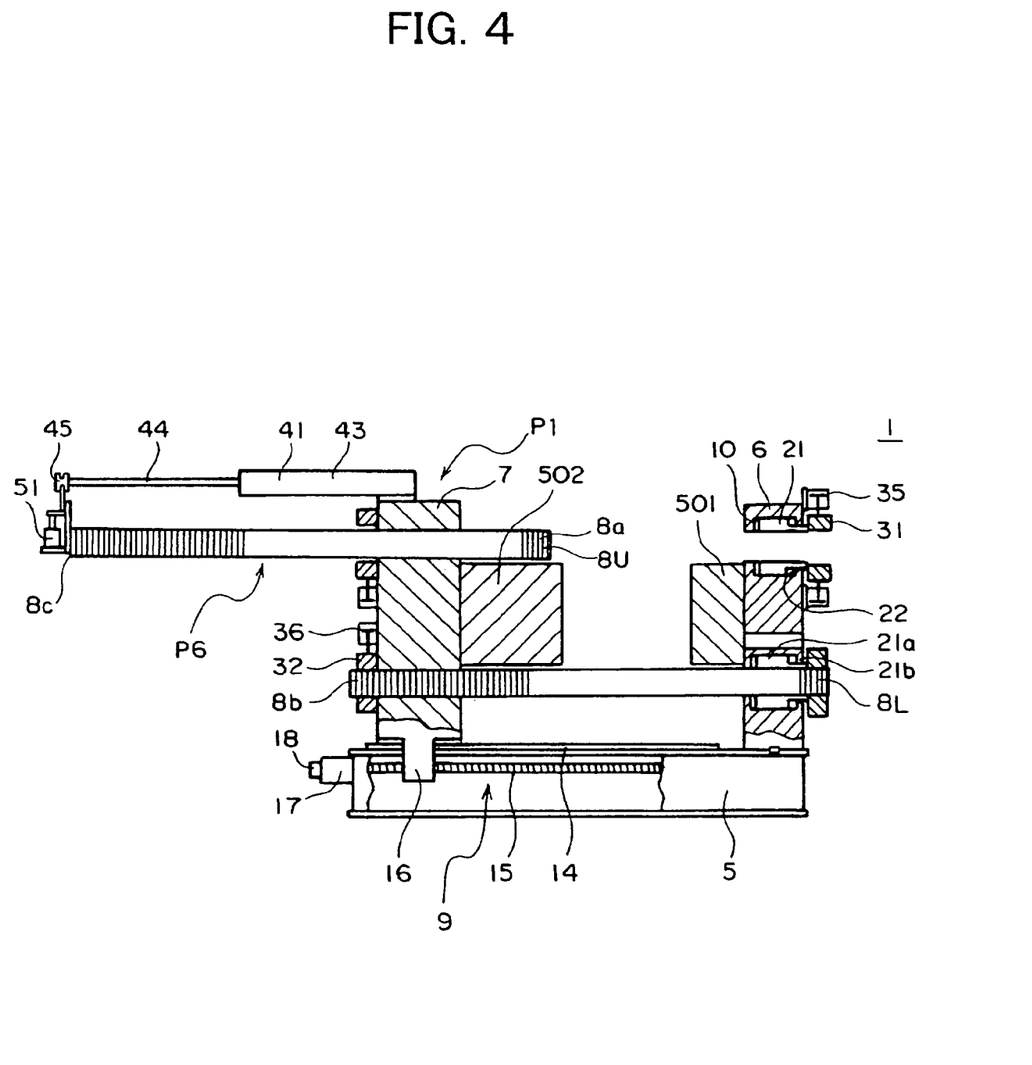
FIG. 4 is a sectional view showing the die clamping system of FIG. 1 when the withdrawal of the tie bar is finished.

FIG. 1 to FIG. 4 are sectional views showing a die clamping system 1 according to a first embodiment of the present invention. FIG. 1 shows the die opening state, FIG. 2 shows the die closing state, FIG. 3 shows the middle of a tie bar withdrawal, and FIG. 4 shows the completion of a tie bar withdrawal.

The die clamping system 1, for example, is configured as a die clamping system for use in a die cast machine and is provided with a base 5, a fixed die plate 6 and a moveable die plate 7 facing each other on the base 5, a plurality of tie bars 8U and 8D (hereinafter referred to as simply the "tie bars 8" in some cases) passing through the fixed die plate 6 and the moveable die plate 7, a drive mechanism (die opening and closing part) 9 moving the moveable die plate 7 in the opening and closing direction, and a die clamping cylinder (die clamping part) 10 generating a clamping force.

The fixed die plate 6 is fixed on the base 5. On the surface (die mounting surface) of the fixed die plate 6 facing the moveable die plate 7, not shown T-shaped grooves in which for example bolt heads can be inserted and engaged are provided so as to enable the fixed die 5 to be held.

The moveable die plate 7 is provided on the base 5 movably in the die opening direction A1 and the die closing direction A2. The moveable die plate 7 is, for example, placed on a sliding plate 14 having a flat mounting surface provided on the base 5, whereby it can slide in the opening and closing direction in respect to the base 5. On the surface (die mounting surface) of the moveable die plate 7 facing the fixed die plate 6, the moveable die can be held in the same way as the fixed die plate 6.

By closing the fixed die 501 held at the fixed die plate 6 and the moveable die 502 held at the moveable die plate 7, a cavity is formed between the fixed die 501 and the moveable die 502. The fixed die 501 and the moveable die 502 are, for example, mounted in the approximate centers of the fixed die plate 6 and the moveable die plate 7.

The moveable die plate 7 is moveable between the die opening position P1 shown in FIG. 1 and the die closing position P2 shown in FIG. 2. The die opening position P1 is the same position as the limit position of the die opening direction A1 side of the range of movement of the moveable die plate 7. However, it may be set more to the die closing direction A2 side than the limit position of the die opening direction A1 of the range of movement of the moveable die plate 7. In the following, the die opening position P1 is set at the limit position of the die opening direction A1 side of the range of movement of the moveable die plate 7. The limit position of the range of movement of the moveable die plate 7 is determined by the configurations of the drive mechanism 9, the sliding plate 14, etc.

Further, the die closing position P2 is determined by the thickness of the mounted fixed die 501 and the moveable die 502. However, the range of the position where can become the die closing position is identifiable by the configuration of the drive mechanism 9, the configuration of the sliding plate 14, the set range of the later mentioned second coupled part 8b, etc. In the following, in FIG. 1 to FIG. 4, the die closing position P2 determined by the thickness of the fixed die 501 mounted and the moveable die 502 at the die clamping system 1 is the limit position of the die closing direction A2 side of the range of the position where can become the die closing position. That is, it is the limit position of the die closing direction A2 side of the range of movement of the moveable die plate.

The tie bars 8 include, for example, two tie bars 8U on the upper side and two tie bars 8L on the lower side for a total of four. These pass through four corners of the fixed die plate 6 and the moveable die plate 7. The tie bars 8 have, for example, lengths approximately equal to the base 5 and can pass through the fixed die plate 6 provided at the end part of the base 5 and the moveable die plate 7 positioned at the die opening position P1. That is, they have lengths enabling the moveable die plate 7 to be guided between the die opening position P1 and the die closing position P2.

The drive mechanism 9 is, for example, configured by a so-called ball screw mechanism and is built in the base 5. Specifically, the drive mechanism 9 is provided with a screw shaft 15 extending in the opening and closing direction, a moveable part 16 in which the screw shaft 15 is screwed, a motor 17 rotating the screw shaft 15, and an encoder 18 detecting the rotation of the motor 17.

The rotation of the motor 17 is changed into linear motion of the moveable part 16 in the opening and closing direction through the screw shaft 15. The moveable part 16 is fixed to the moveable die plate 7. The moveable die plate 7 moves to the opening and closing direction with the movement of the moveable part 16. The position of the moveable die plate 7 is identified based on the number of rotations of motor 17 detected by the encoder 18.

Four clamping cylinders 10 are provided corresponding to the four tie bars 8. Each is provided with a ring-shaped piston 21 in which a tie bar 8 is inserted and a cylinder chamber 22 holding at least part of the ring-shaped piston 21.

The ring-shaped piston 21 has a piston part 21*a* slidable in the cylinder chamber 22 and a rod part 21*b* having a smaller diameter than the piston part 21*a*. The piston part 21*a* divides the cylinder chamber 22 into two cylinder chambers. The two cylinder chambers are each provided with a not shown port for feeding or draining the pressurized oil serving as a working fluid. Control of a not shown valve controlling the flow rate of the pressurized oil toward the port enables the pressure differential of the two cylinder chambers to be controlled. The pressure differential causes the piston part 21*a* to be biased in the longitudinal direction of the corresponding tie bar 8.

The die clamping system 1 is provided with a first coupled part 8*a* and a first coupling part 31 for coupling each tie bar 8 and the fixed die plate 6 and releasing the coupling action and a second coupled part 8*b* and a second coupling part 32 for coupling the tie bar 8 and the moveable die plate 7 and releasing the coupling action. Further, the first coupled part 8*a* and the first coupling part 31 configure a fixed die plate coupling part, while second coupled part 8*b* and the second coupling part 32 configure the moveable die plate coupling part.

Each first coupled part 8*a*, for example, is comprised by coupled grooves formed by a groove extending in a spiral shape around the periphery of the tie bar 8 or coupled grooves formed by a plurality of grooves extending around the periphery of the tie bar 8 and arranged in the longitudinal direction of the tie bar 8.

Each first coupling part 31 is, for example, configured by a half nut. The opening and closing of the half nut enables engagement (coupling) with the coupled grooves or that coupling to be released. Among the first coupling parts 31, at least the upper first coupling parts provided for tie bars 8U are opened and closed by first coupling drive parts 35. The first coupling drive parts 35 are, for example, configured by oil pressure cylinders. Their operation principle is the same as that of the clamping cylinders 10. Further, the first coupling parts 31 provided for the tie bars 8L are opened and closed by whatever means is appropriate regardless of being manual or automatic.

Each first coupling part 31 is provided on the back surface of the fixed die plate 6 (the side opposite the surface mounting the fixed die 501). The rod part 21*b* of the piston 21 protrudes from the back surface of the fixed die plate 6. The first coupling part 31 engages with the rod part 21*b* in the longitudinal direction of the tie bar 8. Therefore, the coupling of the first coupled part 8*a* and the first coupling part 31 and releasing the coupling action causes the coupling of the tie bar 8*a* and the fixed die plate 6 and releasing the coupling action.

Each second coupled part 8*b*, for example, like the first coupled part 8*a*, for example, is comprised by coupled grooves formed by a groove extending in a spiral shape around the periphery of the tie bar 8 or coupled grooves formed by a plurality of grooves extending around the periphery of the tie bar 8 and arranged in the longitudinal direction of the tie bar 8.

Each second coupling part 32 is, for example, like the first coupling part 31, configured by a half nut. The opening and closing of the half nut enables engagement (coupling) with the coupled grooves or that coupling to be released. The second coupling part 32 is opened and closed by a second coupling drive part 36. The second coupling drive part 36 is, for example, configured by an oil pressure cylinder. Its operation principle is the same as that of the clamping cylinder 10.

Each second coupled part 8*b* is provided from the end part 8*c* of the tie bar 8 at the moveable die plate 7 side over a length substantially equal to the range of movement of the moveable die plate 7 in the opening and closing direction. On the other hand, the corresponding second coupling part 32 is arranged in the back surface of the moveable die plate 7 (the side opposite the surface mounting the moveable die 502). Therefore, when the first coupled part 8*a* and the first coupling part 31 are in a coupled state, the second coupled part 8*b* and the second coupling part 32 can be coupled with each other no matter what the position from the die opening position P1 to the die closing position P2 the moveable die plate 7 is in.

The die clamping system 1 is provided with a withdrawal cylinder 41 for generating the driving force used for moving the tie bars 8U in the withdrawing direction B1 (direction the same as the die opening direction A1) and withdrawing them from the fixed die plate 6 or moving the tie bars 8U in the insertion direction B2 (direction the same as the die closing direction A2) and inserting them into the fixed die plate 6.

The withdrawal cylinder 41 is, for example, configured by an oil pressure cylinder which is provided with a piston 42, a cylinder part 43 holding the piston 42, a piston rod 44 fixed to the piston 42, and a moveable part 45 provided on the tip of the piston rod 44. The operation principle of the withdrawal cylinder 41 is the same as that of the clamping cylinder 10.

The cylinder part 43 is fixed on the top part of the moveable die plate 7. The cylinder part 43 is arranged so as to extend to the back side of the moveable die plate 7 and does not protrude to the die mounting surface side of the moveable die plate 7. For example, the cylinder part 43 is arranged so that the end part of the opposite side to the end part at which the piston rod 44 enters and exits is positioned at the upper center of the moveable die plate 7. The moveable part 45 is positioned more to the back side than the moveable die plate 7 and is moved along with the piston rod 44 by the pressurized oil in the cylinder part 44 to the withdrawing direction B1 or the insertion direction B2.

A hook system 51 engaging with the moveable part 45 of the withdrawal cylinder 41 is provided at the end part 8*c* of each tie bar 8U.

Figure 5:
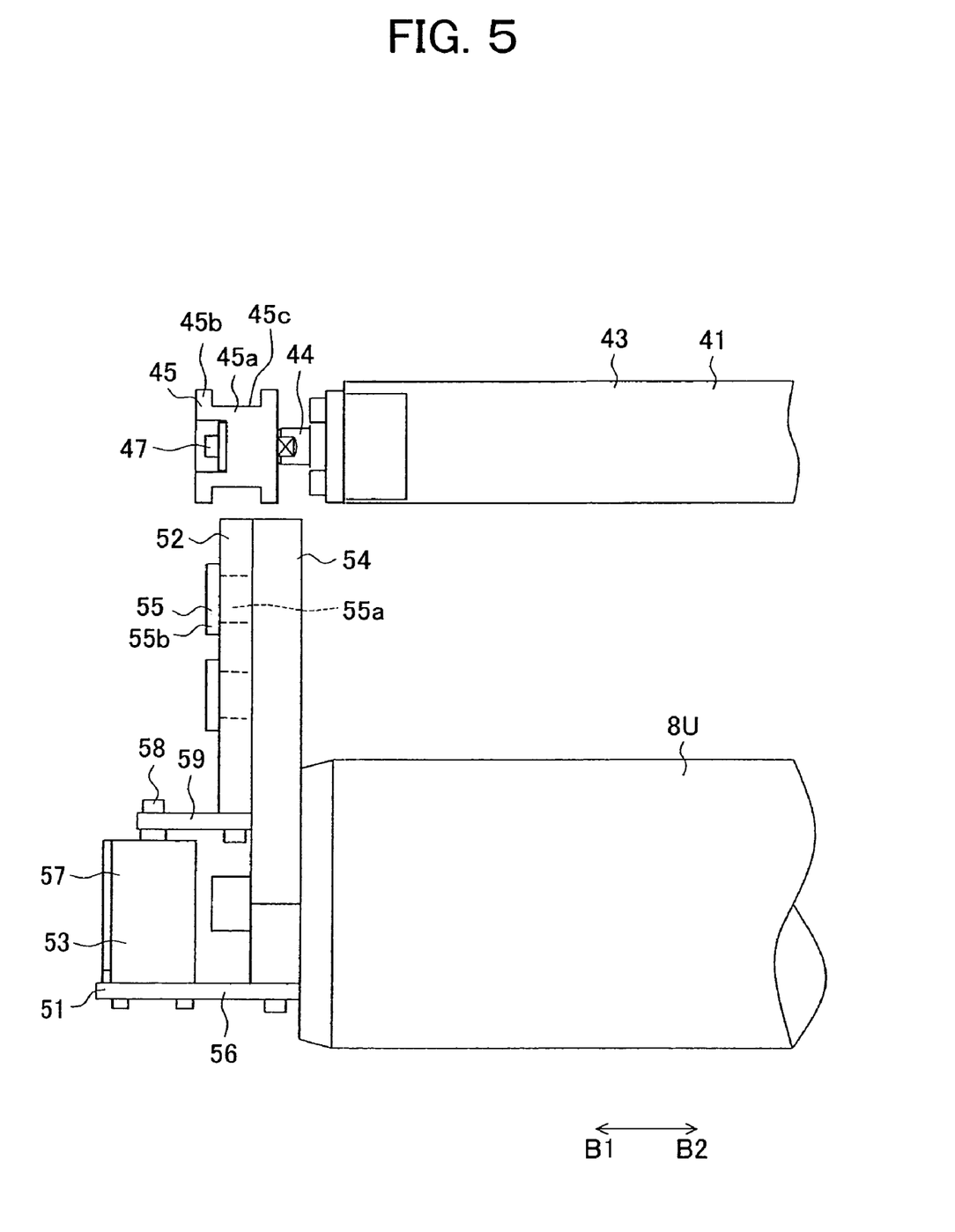
FIG. 5 is a side view showing a withdrawal cylinder and a hook system of the die clamping system of FIG. 1, FIGS. 6A and 6B are front views showing a withdrawal cylinder and a hook system of the die clamping system of FIG. 1, FIGS. 7A and 7B are views showing the effect of the die clamping system of FIG. 1, and FIGS. 8A and 8B are views showing the effect of the die clamping system of FIG. 1.
Figure 6A:
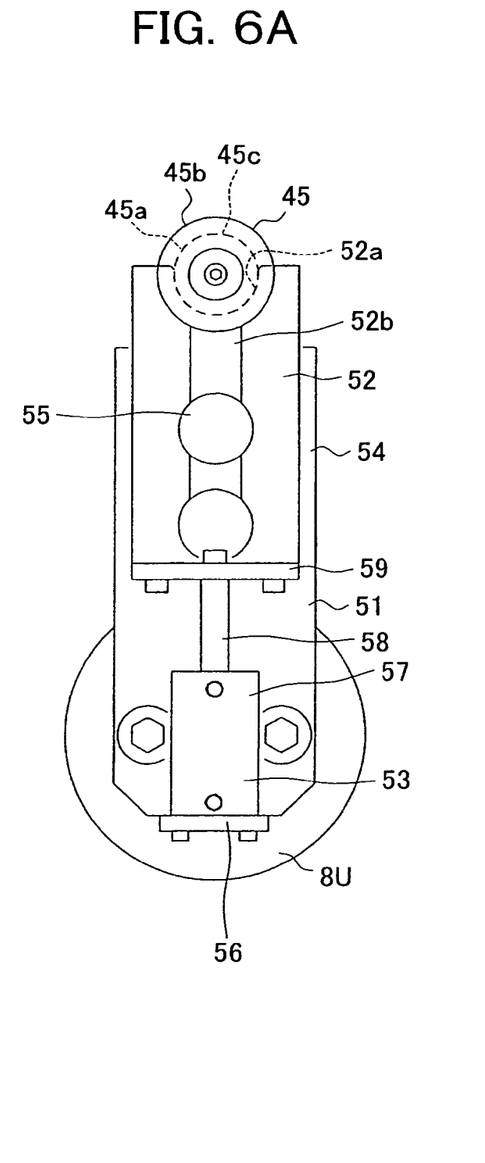
Figure 6B:
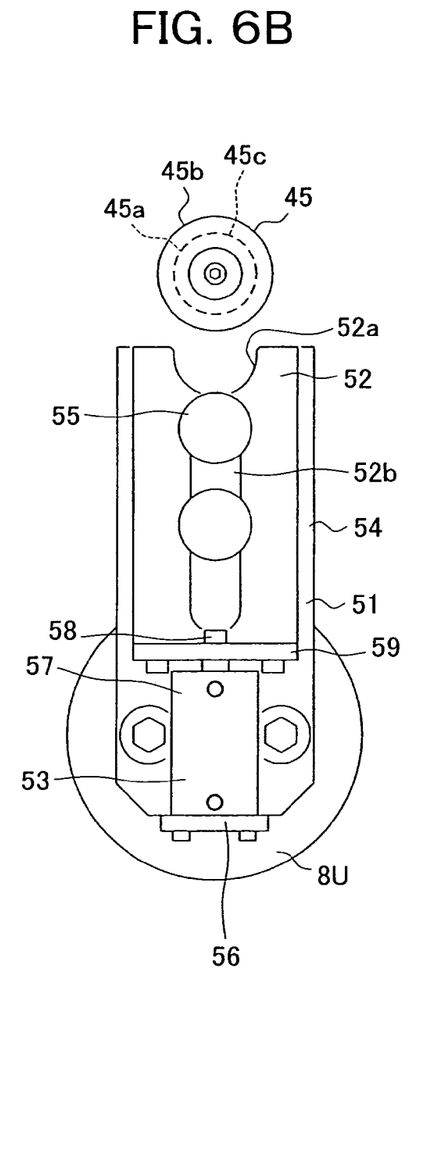

FIG. 5 is a side view showing the withdrawal cylinder 41 and a hook system 51 (from the same direction as FIG. 1), and FIGS. 6A and 6B are front views of the moveable part 45 and the hook system 51 (from the left of FIG. 5).

The moveable part 45 is, for example, a cylinder having the withdrawing direction B1 as its axial direction and provided at its outer circumference with coupled grooves 45*c* opening toward the direction perpendicular with the withdrawing direction B1 and extending in ring shapes. That is, the moveable part 45 is provided with a base part 45*a* and flange parts 45*b*. The base part 45*a* is formed to a cylindrical shape having the withdrawing direction B1 as its axial direction. The flange parts 45*b* are provided at the two ends of the base part 45*a* and protrude from the base part 45*a* in a direction perpendicular to the withdrawing direction B1. The flange parts 45*b* are formed in disk shapes having the same axis as the base part 45*a*. Note that the moveable part 45 is fixed to the piston rod 44 by screwing a bolt 47 inserted in a through hole provided at the center of the member into the piston rod 44.

The hook system 51 is provided with a hook plate (plate member) 52 insertable into the coupled grooves 45c and a plate elevator cylinder (plate drive part) 53 for moving the hook plate 52 in and out of the coupled grooves 45c.

The hook plate 52 is arranged in a direction perpendicular to the withdrawing direction B1 of a tie bar. Inserting the hook plate 52 into the coupled grooves 45c and engaging it with the flange parts 45b will cause the moveable part 45 of the withdrawal cylinder 41 to be coupled with the tie bar 8U. Further, the hook plate 52, as shown in FIG. 6A and FIG. 6B, is formed at its edge at the withdrawal cylinder 41 side with a semicircular cutaway part 52 in which the base part 45a may fit. It can therefore engage along a comparatively wide range (half circle) of the flange part 45b.

The hook plate 52 is attached to be moveable with respect to a tie bar 8U in a direction perpendicular to the withdrawing direction B1 through the mounting plate 54. Specifically, this is as follows.

The mounting plate 54 is arranged at the end part 8c of the tie bar 8U in a direction perpendicular to the longitudinal direction of the tie bar 8U and is fixed to the end part 8c by bolts etc. Guide pins 55 protruding in the withdrawing direction B1 side from the mounting plate 54 are provided at the mounting plate 54. Two guide pins 55 are, for example, provided in a line from the tie bar 8U to the withdrawal cylinder 41 side. The guide pins 55 are, for example, as shown in FIG. 5, formed in cylindrical shapes with enlarged ends and therefore are provided with cylindrical shaped base parts 55a and disk shaped flange parts 55b protruding at the front ends of the base parts 55a in the direction perpendicular to the tie bar 8U.

On the other hand, the hook plate 52 is provided with a long hole 52b continuing from the cutaway part 52a. The width of the long hole 52b is larger than the base parts 55a of the guide pins 55 and is smaller than the flange parts 55b. Further, the hook plate 52 is attached over the mounting plate 54 so that the base parts 55a are inserted in the long hole 52b from the cutaway part 52a side. By doing so, the hook plate 52 is limited in movement to the withdrawing direction B1 side by the flange parts 55b of the guide pins 55, is guided to the withdrawal cylinder 41 side by the base parts 55a of the guide pins 55, and slides with respect to the mounting plate 54.

The plate elevator cylinder 53 is configured, for example, by a pneumatic cylinder provided with a cylinder part 57 and a piston rod 58 connected with a not shown piston held in the cylinder part 57.

The cylinder part 57 is, for example, fixed by bolts etc. on a horizontal support plate 56 fixed by bolts etc. to the mounting plate 54. The piston rod 58 is moveable forwards and backwards in the direction of the withdrawal cylinder 41 from the cylinder part 57. The piston rod 58 and the hook plate 52, for example, are connected to each other by fixing a horizontally arranged connection plate 59 to the front end of the piston rod 58 and the lower end of the hook plate 52 by bolts etc.

Note that the coupled grooves 45c of the moveable part 45 and the hook system 51 form the withdrawing coupling part.

As shown in FIG. 1, the die clamping system 1 is provided with a control unit 61 for controlling the operations of the different parts. The control unit 61 is, for example, comprised by a computer containing a CPU, ROM, RAM, etc. The control unit 61 outputs to the motor 17 a control signal based on the rotational position of the motor 17 detected by the encoder 18 to move the moveable die plate 7 at an appropriate speed to an appropriate position. Further, the control unit 61 controls the opening and closing operations of the valves used for feeding the fluid to the cylinder chambers based on the cylinder chamber pressure or a position signal detected at the clamping cylinder 10, the first coupling drive part 35, the second coupling drive unit 36, the withdrawal cylinder 41, and the plate elevator 53 of the hook system 51.

Further, in addition to the die clamping system 1, the die cast machine containing the die clamping system 1 is provided with a not shown injection system feeding the melt to the die clamping system 1. The injection system is, for example, provided with an injection sleeve connected to the cavity formed by the fixed die 501 and the moveable die 502, a plunger tip sliding inside the injection sleeve, and an injection cylinder driving the plunger tip.

The operations of the aforementioned die clamping system 1 are as follows.

First, the operations of the die clamping system 1 in the molding cycle will be explained. At the beginning of the molding cycle, the moveable die plate 7 is positioned at the die opening position P1 shown in FIG. 1. At this time, the first coupled parts 8a and the first coupling parts 31 are coupled. That is, the tie bars 8 and the fixed die plate 6 are fixed. Further, the coupling action of the second coupled parts 8b and the second coupling parts 32 is released. That is, the coupling action of the tie bars 8 and the moveable die plate 7 is released.

From this state, the drive mechanism 9 moves the moveable die plate 7 toward the die closing direction A2. When the moveable die plate 7 reaches the die closing position P2 shown in FIG. 2 and the fixed die 501 and the moveable die 502 come into contact, the die closing operation ends. FIG. 2 shows a state wherein the hook system 51 is coupled to a moveable part 45, however, in the molding cycle, the coupling action of the hook system 51 and the moveable part 45 remains released.

At this time, the second coupling parts 32 provided at the moveable die plate 7 are positioned within the range of the second coupled parts 8b of the tie bars 8. However, there are also cases where the grooves of the second coupled parts 8b and the teeth of the second coupling parts 32 are misaligned by an amount smaller than the pitch. In this case, the position of the ring-shaped piston 21 within the cylinder chamber 22 is adjusted by feeding pressurized oil to the cylinder chamber 22 etc. so as to enable the second coupled parts 8b and the second coupling parts 32 to be engaged. Next, the second coupling parts 32 are closed to engage the second coupling parts 32 and the second coupled parts 8b. That is, the tie bars 8 and the moveable die plate 7 are coupled.

Next, the clamping cylinders 10 perform the clamping operation. That is, in the state where the tie bars 8 are fixed to the fixed die plate 6 and the moveable die plate 7, the clamping cylinders 10 apply tension to the tie bars 8 so as to generate a clamping force in accordance with the amount of extension of the tie bars 8. Note that during this, the motor 17 of the drive mechanism 9 is in a torque-free state.

In this state, the melt is injected from the injection system into and fills the cavity formed by the fixed die 501 and the moveable die 502. When the melt solidifies in the cavity and the die casting is formed, the clamping force from the clamping cylinders 10 is reduced to end the clamping operation. Next, the second coupling parts 32 are opened to release the coupling action of the second coupling parts 32 and the second coupled parts 8b. That is, the coupling action of the moveable die plate 7 and the tie bars 8 is released.

Next, the drive mechanism 9 moves the moveable die plate 7 toward the die opening direction A1. Note that at this time, the first coupled parts 8a and the first coupling parts 31 are coupled. That is, the tie bars 8 and the fixed die plate 6 are coupled.

Afterwards, the moveable die plate 7 reaches the die opening position P1 in the beginning of the cycle (FIG. 1). The molded article is taken out and the fixed die 501 and the moveable die 502 are coated with a release agent and otherwise treated to end the molding cycle.

Next, the operation of the die clamping system 1 during the withdrawal of the tie bars will be explained.

As explained above, at the point of time when the molding cycle ends, the moveable die plate 7 is positioned at the die opening position P1 shown in FIG. 1. At this time, the first coupled parts 8a and the first coupling parts 31 are coupled, while the coupling action of the second coupled parts 8b and the second coupling parts 32 is released.

From this state, in the same way as the die closing operation of the molding cycle, the moveable die plate 7 is moved until the die closing position P2 shown in FIG. 2. Note that the speed control at this time may be the same as the speed control at the time of the die closing operation during the molding cycle or may be different.

Next, the hook system 51 and the moveable parts 45 are coupled. That is, the withdrawal cylinder 41 and the tie bars 8 are coupled. Further, the coupling action of the first coupled parts 8a and the first coupling parts 31 used for the tie bars 8U is released. That is, the coupling action of the tie bars 8U and the fixed die plate 6 is released.

Further, as shown in FIG. 3, the drive mechanism 9 moves the moveable die plate 7 until the die opening position P1. By doing this, the tie bars 8U, to which the drive force of the drive mechanism is transmitted through the withdrawal cylinder 41 and the moveable die plate 7, are withdrawn from the fixed die plate 6 and moved until the first withdrawing position P5.

Afterwards, as shown in FIG. 4, the withdrawal cylinder 41 moves the moveable parts 45 to the withdrawing direction B1. By doing this, the tie bars 8U are moved to the second withdrawing position P6.

Note that the withdrawal of the tie bars 8U to the first withdrawing position P5 by the drive mechanism 9 can be conducted by moving the moveable die plate 7 until the die opening position P1 in the state where the second coupled parts 8b and the second coupling parts 32 provided corresponding to the tie bars 8U are coupled. Further, the coupling of the moveable parts 45 and the hook system 51 and the coupling of the second coupled parts 8b and the second coupling parts 32 can be conducted together.

Further, when withdrawing the tie bars 8U by the die opening operation of the moveable die plate 7 in the state where the moveable parts 45 and the hook system 51 are coupled, it is also possible to first execute the movement of the moveable parts 45 by the withdrawal cylinder 41, then open the moveable die plate 7 by the drive mechanism 9 or to simultaneously move the moveable parts by the withdrawal cylinder 41 and open the moveable die plate 7 by the drive mechanism 9.

In the die clamping system 1, the insertion of the tie bars 8U to the fixed die plate 6 is also possible. In this case, the operation may be performed by a procedure opposite to that of withdrawal. That is, from the state in FIG. 4, the withdrawal cylinder 41 moves the moveable parts 45 to the insertion direction B2 and the drive mechanism 9 moves the moveable die plate 7 to the die closing direction A2, whereby the state in FIG. 2 can be achieved.

According to the above embodiment, in the movement of the tie bars 8U during the withdrawal, the movement until the first withdrawing position is handled by the drive mechanism 9, while the movement until the second withdrawing position from the first withdrawing position is handled by the withdrawal cylinder 41, so the withdrawal cylinder 41 does not require a stroke equivalent to the amount of movement of the tie bars 8U during the withdrawal. This enables a reduction of size of the withdrawal cylinder 41.

Figure 7A:
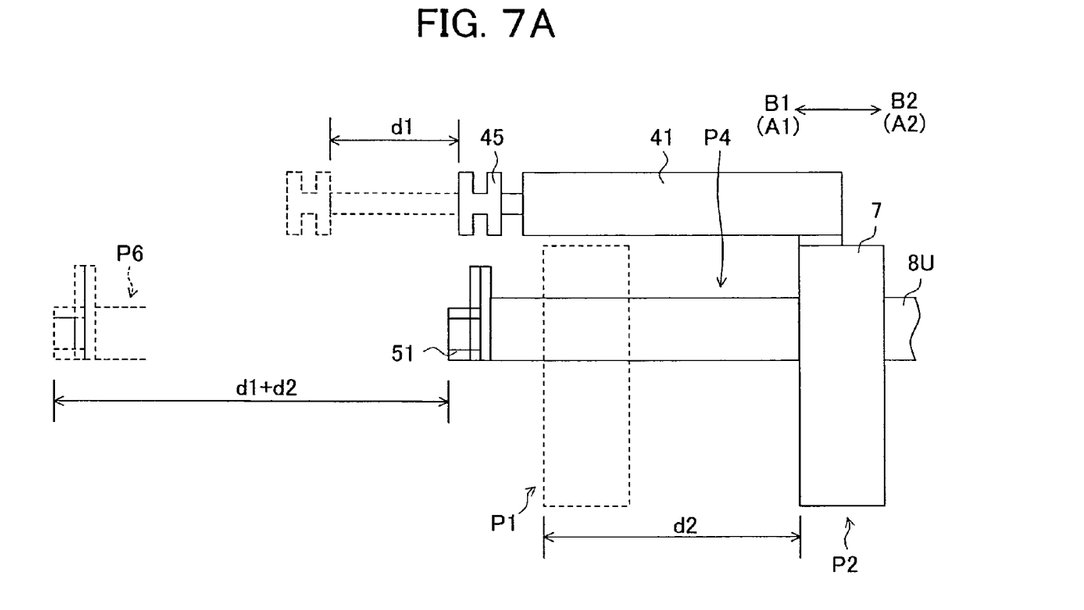

FIG. 7A is a conceptual view showing the effect of the above embodiment. In FIG. 7A, the moveable die plate 7 and the tie bars 8U of the solid lines shows the state shown in FIG. 2. If the stroke of the withdrawal cylinder 41 is d1 and the movement distance from the die closing position P2 of the moveable die plate 7 until the die opening position P1 is d2, then the amount of movement of the tie bars 8U from the position P4 not withdrawn from the fixed die plate 6 until the second withdrawing position P6 becomes d1+d2.

Further, in the above embodiment, when the tie bars 8U are in a non-withdrawn position P4 (in a position where the first coupled part 8a and the first coupling part 31 are mutually coupleable), the moveable die plate 7 is in the die closing position P2 (at a limit position of the die closing direction A2 side of the range of movement of the moveable die plate 7), and the moveable parts 45 are at the limit position of the insertion direction B2 side of that range of movement, the moveable parts 45 and the hook systems 51 can be coupled. Therefore, the stroke d1 of the withdrawal cylinder 41 and the distance d2 from the die closing position P2 until the die opening position P1 are all added to the amounts of movement of the tie bars 8U.

Figure 7B:
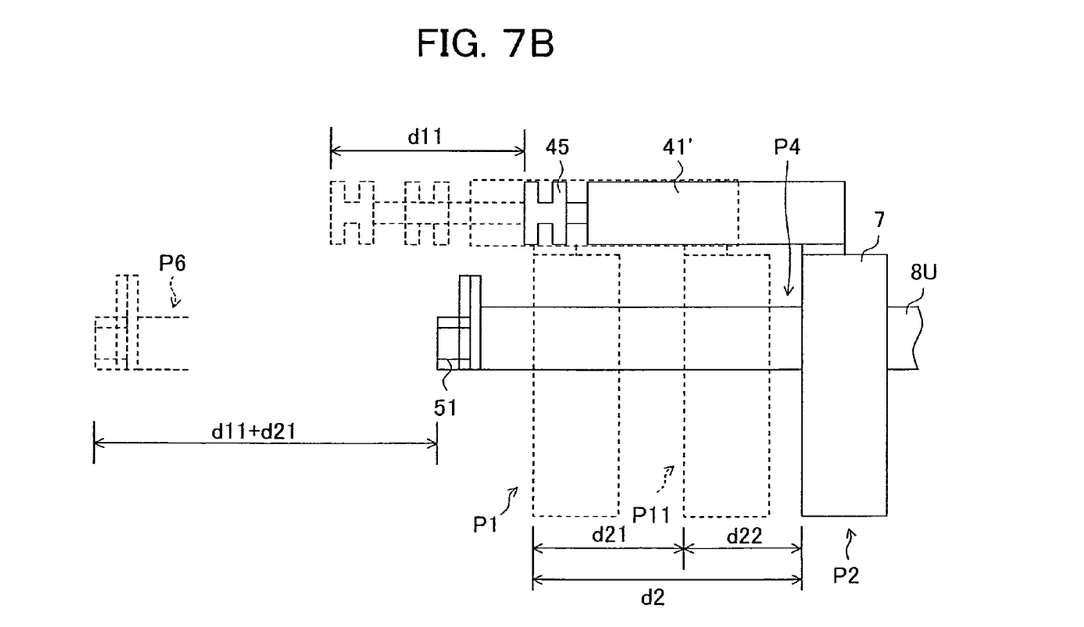

However, as in the modification of the present invention shown in FIG. 7B, when the tie bars 8U are at the non-withdrawn position P4, the moveable die plate 7 is at the die closing position P2, and the moveable parts 45 are at the limit position of the insertion direction B2 side of that range of movement, the moveable parts 45 are positioned more at the insertion direction B2 side than the hook systems 51 and the moveable parts 45 and the hook systems 51 cannot be engaged. In this case, in the state where the coupling action of the second coupled parts 8b and the second coupling parts 32 is released, that is, in a state where the coupling action of the tie bars 8U and the moveable die plate 7 is released, it is necessary that the drive mechanism 9 move the moveable die plate 7 until an intermediate position P11 between the die closing position P2 and the die opening position P1 and couple the moveable parts 45 and the hook systems 51. In this case, the movement distance of the moveable die plate 7 to be added to the stroke d11 of the withdrawal cylinder 41' as the amount of movement of the tie bars 8U (d11+d21) is only the distance d21 from the intermediate position P11 until the die opening position P1.

Therefore, in the present embodiment, when the moveable die plate 7 is at the die closing position P2 and the tie bars 8U are not withdrawn from the fixed die plate 6, the moveable parts 45 at the limit position of the insertion direction B2 side of the range of movement and the hook systems 51 can be coupled. Therefore, in comparison to the configuration shown in FIG. 7B, the amount of movement of the tie bars 8U can be made larger by the distance d22 from the die closing position P2 until the intermediate position P11 or the withdrawal cylinder 41 can be made smaller.

However, even with the configuration shown in FIG. 7B, the distance d21 can be added to the stroke d11 of the withdrawal cylinder 41' to form the amount of movement of the tie bars 8U. Compared with the past, the amount of movement of the tie bars 8U can be made larger or the withdrawal cylinder 41' can be made smaller. That is, the effects of the present invention can be exhibited if the moveable parts 45 and the hook systems 51 can be coupled when the tie bars 8U are at the non-withdrawn position, the moveable parts 45 are at the limit position of the insertion direction B2 side of the range of movement of the moveable parts, and the moveable die plate 7 is at a position further to the die closing direction A2 side than the die opening position P1.

However, the provision of the withdrawal cylinder 41' is meaningful when d11+d21>d2, that is, cases when d11>d22. Further, when the tie bars 8U are at the non-withdrawn position, the moveable parts 45 are at the limit position of the insertion direction B2 side of the tie bars of the range of movement of the moveable parts, and the moveable die plate 7 is at the die opening position P1, the moveable parts 45 are positioned more to the withdrawing direction B1 side than the hook systems 51 and the moveable parts 45 and the hook systems 51 cannot be coupled. In this case, the moveable parts 45 and the hook systems 51 cannot be coupled even if the moveable die plate 7 is moved, therefore the withdrawal cylinder loses its meaning.

Further, in the present embodiment, the hook systems 51 are provided at the end parts 8c of the tie bars 8U protruding from the moveable die plate 7, so the withdrawal cylinder 41 is configured to make the moveable parts move at the back side of the moveable die plate 7. Therefore, the withdrawal cylinder 41 can be positioned so it does protrude to the die mounting surface side of the moveable die plate 7.

Figure 8A:
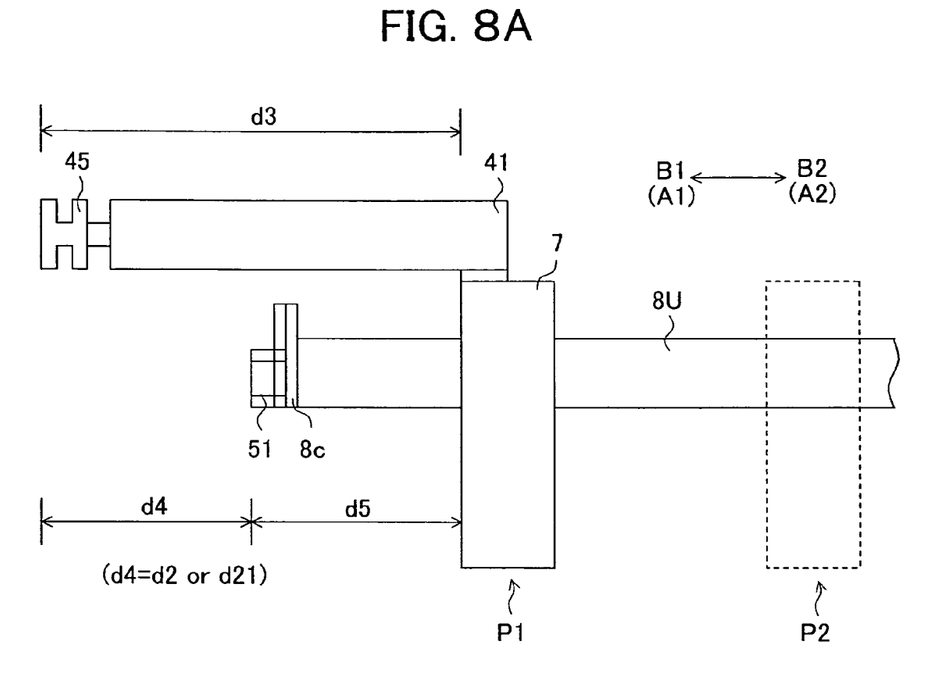

Here, in the above embodiment (and the modification of FIG. 7B), the moveable part 45 and the hook systems 51 are configured so as to be coupled when the tie bars 8U are not withdrawn from the fixed die plate 6, the moveable die plate 7 is positioned more to the die closing direction A2 side than the die opening position P1, and the moveable parts 45 are at the limit position of the insertion direction B2 side of the range of movement. Therefore, if releasing the coupling action of the moveable die plate 7 and the tie bars 8U and moving the moveable die plate 7 from the state shown in FIG. 7A to the die opening position P1, as shown in FIG. 8A, the moveable parts 45 will protrude more to the withdrawing direction B1 side by a distance d4 compared with the hook systems 51. The distance d4, if in the configuration of FIG. 7A, is d4=d2, while if in the configuration of FIG. 7B, is d4=d21. This means the amount of protrusion d3 of the withdrawal cylinder 41 from the moveable die plate can be made larger by a distance d4 than the amount of protrusion d5 of the tie bars 8U from the moveable die plate 7 positioned at the die opening position P1. That is, for the tie bars 8U, the amount of protrusion d5 from the moveable die plate 7 positioned at the die opening position P1 may be made smaller than the amount of protrusion d3 by a distance d4.

Figure 8B:
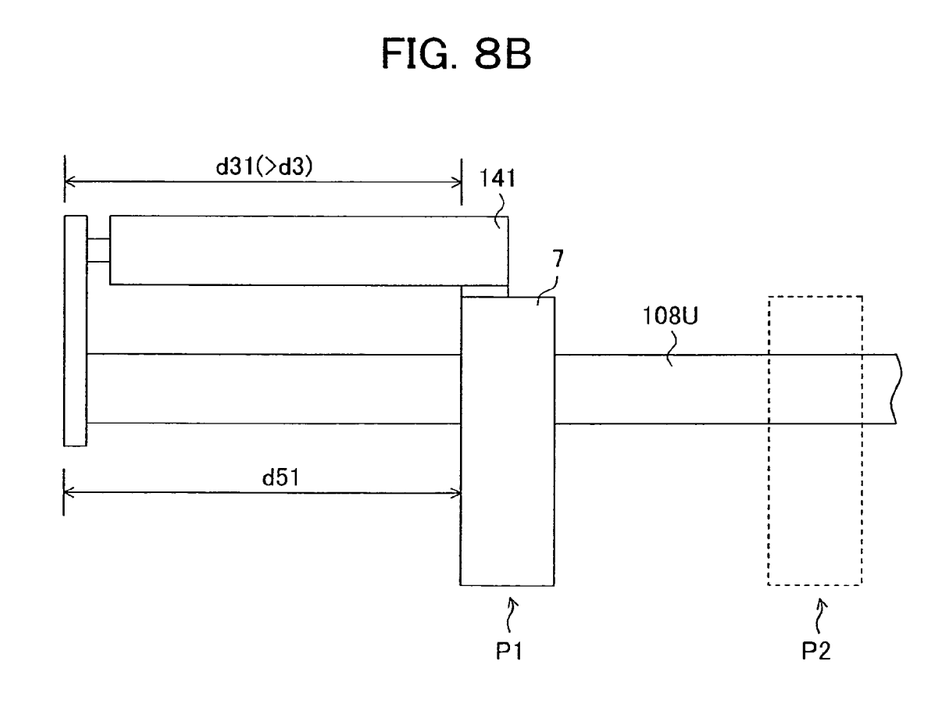

However, if, as in the past, the hook systems 51 are not provided and the cylinder rods and the tie bars are fixed together, as shown in FIG. 8B, the amount of protrusion of the tie bars 108U must be the same level as the amount of protrusion d31 of the withdrawal cylinder 141. Further, in FIG. 8B, if trying to secure an amount of movement of the tie bars equivalent to FIG. 8A, as will be understood from FIG. 7A, the withdrawal cylinder 141 must have a stroke of d1+d2. Therefore, the amount of protrusion d31 of the withdrawal cylinder 141 from the moveable die plate 7 becomes d31=d3+d2 and larger than the amount of protrusion d3.

Therefore, in the die clamping system 1 of the present embodiment, tie bars 8U can be made shorter than the conventional tie bars 108U by 2×d2. Alternatively, the withdrawal cylinder 41 can be arranged more at the back side of the moveable die plate 7 than the past, and the protrusion of the withdrawal cylinder between the moveable die plate 7 and the fixed die plate 6 can be prevented. Further, in the preferred embodiment, as the tie bars 8 and the base 5 have lengths shortened to the same level, so the reduction of the tie bars 8U therefore contributes to the reduction of the size of the entire die clamping system 1 containing the base 5 etc.

The present invention is not limited to the above embodiments and may be embodied in various ways.

The molding machine wherein the die clamping system of the present invention is applied is not limited to a die cast machine. The molding machine includes a metal molding machine, a plastic injection molding machine, a sawdust molding machine, etc. Sawdust molding machines include, for example, machines molding a material comprised of sawdust mixed with a thermoplastic resin.

In the present invention, to withdraw the tie bars along with the opening of the moveable die plate, the moveable die plate and the tie bars must be coupled. Further, the coupling of the moveable die plate and the tie bars may be obtained by providing the withdrawal cylinder at the moveable die plate and coupling the withdrawal cylinder and the tie bars so as to indirectly couple the moveable die plate and the tie bars or by using moveable die plate coupling part (the second coupled parts and the second coupling parts) to directly couple the moveable die plate and the tie bars.

If providing the withdrawal cylinder at the moveable die plate, indirectly coupling moveable die plate and the tie bars by coupling the withdrawal cylinder and the tie bars, and withdrawing the tie bars along with opening of the moveable die plate, the moveable die plate coupling part are not a necessary requirement of the present invention. Therefore, for example, the present invention can be used for a toggle type die clamping system which does not couple the moveable die plate and the tie bars.

If providing moveable die plate coupling part, directly coupling the moveable die plate and the tie bars, and withdrawing the tie bars along with opening of the moveable die plate, providing the withdrawal part at the moveable die plate is not a necessary requirement of the present invention. For example, it is also possible to use moveable die plate coupling part to couple the moveable die plate and the tie bars and move the moveable die plate in the opening direction to move the tie bars to the first withdrawing position and, in addition, to provide withdrawing part for coupling with the tie bars at the first withdrawing position and moving the tie bars to a second withdrawing position further from the first withdrawing position at the base or the fixed die plate. Even in these cases, the movement of the tie bars is divided between the moveable die plate and the withdrawing part.

The first coupled parts may also be provided at the fixed die plate, and the first coupling parts at the tie bars. The second coupled parts may also be provided at the moveable die plate, and the second coupling parts at the tie bars. Third coupled parts may be provided at the moveable die plate, and the third coupling parts at the moveable parts of the withdrawing part. Further, these coupled parts and coupling parts may be appropriately comprised and are not limited to coupling grooves and half nuts or to coupling grooves and hook plates. For example, for withdrawing the tie bars, a force as strong as during clamping is not applied to the tie bars, so instead of the hook systems of the third coupling parts, gripping systems that can grip the appropriate positions of the tie bars by a predetermined pressure may be provided so as to eliminate the need for the third coupled parts. Further, the coupling parts are not limited to being driven by oil pressure cylinders and for example may be driven by motors.

A single tie bar may also be provided. However, in to keep the degree of parallelism of the fixed die and the moveable die for clamping, it is preferable that a plurality be provided.

The die opening and closing part may only be any one which moves the moveable die plate in the opening and closing direction and is not limited to a ball-screw configuration. For example, it may be configured by a pressurized oil cylinder or by a rack and pinion mechanism. The clamping force generating part is not limited to a cylinder system having a cylinder chamber inside the fixed die plate. For example, it may be comprised by a ball-screw configuration. Further, the die clamping system does not have to be comprised as a composite type die clamping system. Like with a double toggle type of clamping system, both the die opening and closing part and the clamping force generating part can be used.

The withdrawing part may be any one moving moveable parts with respect to the moveable die plate. It is not limited to an oil pressure cylinder. For example, it may be composed by a ball-screw configuration or a rack and pinion mechanism.

In the above embodiment, the opening position in the molding cycle is the limit position of the die opening direction of the moveable range, however, a position at the die closing direction side further than the limit position may also be the die opening position in the molding cycle and, during the withdrawal of the tie bars, movement to the die opening direction side further than the die opening position is possible.

While the invention has been described by reference to specific embodiments chosen for the purposes of illustration, it should be apparent that numerous modifications could be made thereto by those skilled in the art without departing from the basic concept and scope of the invention.

What is claimed is:

1. A die clamping system comprising:
   a fixed die plate,
   a moveable die plate moveable in an opening and closing direction with respect to the fixed die plate,
   a tie bar inserted into said fixed die plate and said moveable die plate and able to be withdrawn from said fixed die plate,
   a die opening and closing part moving said moveable die plate in the opening and closing direction,
   a withdrawing part having a moveable part capable of being coupled with said tie bar, provided on said moveable die plate, and moving said moveable part with respect to said moveable die plate in the withdrawing direction of said tie bar, and
   a withdrawing coupling part coupling said moveable part and said tie bar and releasing the coupling action,
   said withdrawing coupling part can couple said moveable part and said tie bar when said tie bar is not withdrawn from said fixed die plate, said moveable part is at the limit position of the insertion direction side of said tie bar in the range of movement of said moveable part, and said moveable die plate is at a position at the die closing direction side from the limit position of the die opening direction side of the range of movement of said moveable die plate.

2. A die clamping system as set forth in claim 1, wherein said withdrawing coupling part can couple said moveable part and said tie bar when said tie bar is not withdrawn from said fixed die plate, said moveable part is at the limit position of the insertion direction of said tie bar in the range of movement of said moveable part, and said moveable die plate is at the limit position of the die closing direction in the range of movement of said moveable die plate.

3. A die clamping system as set forth in claim 1, wherein said withdrawing coupling part couples an end part of said tie bar protruding in said withdrawing direction side from said moveable die plate with said moveable part and releases the coupling action.

4. A die clamping system comprising:
   a fixed die plate,
   a moveable die plate moveable in an opening and closing direction with respect to the fixed die plate,
   a tie bar inserted into said fixed die plate and said moveable die plate and able to be withdrawn from said fixed die plate,
   a die opening and closing part moving said moveable die plate in the opening and closing direction,
   a withdrawing part having a moveable part capable of being coupled with said tie bar, provided on said moveable die plate, and moving said moveable part with respect to said moveable die plate in the withdrawing direction of said tie bar, and
   a withdrawing coupling part coupling said moveable part and said tie bar and releasing the coupling action, and
   a control part controlling operations of said withdrawing coupling part, said die opening and closing part, and said withdrawing part so that in the state of coupling through said withdrawing coupling part, said die opening and closing part moves said moveable die plate in said die opening direction and said withdrawing part moves said tie bars in the withdrawing direction.

5. A die clamping system comprising:
   a fixed die plate,
   a moveable die plate moveable in an opening and closing direction with respect to the fixed die plate,
   a tie bar inserted into said fixed die plate and said moveable die plate and able to be withdrawn from said fixed die plate,
   a moveable die plate coupling part coupling said moveable die plate and said tie bar and releasing the coupling action,
   a die opening and closing part moving said moveable die plate to the opening and closing direction,
   a withdrawing part having a moveable part capable of being coupled with said tie bar and moving said moveable part in the withdrawing direction of said tie bar,
   a withdrawing coupling part for engaging said moveable part and said tie bar, and
   a control part controlling operations of said moveable die plate coupling part, said withdrawing coupling part, said die opening and closing part, and said withdrawing part so that in the state of coupling by said moveable die plate coupling part, said die opening and closing part moves said moveable die plate in said die opening direction, and then, in the state of releasing the coupling action by said moveable die plate coupling part and coupling by said withdrawing coupling part, said withdrawing part moves said moveable part in the withdrawing direction.

6. A die clamping system as set forth in claim 5, wherein said withdrawing part is provided at said moveable die plate.

7. A die clamping system as set forth in claim 1, wherein said withdrawing part is a cylinder device having a piston coupled with the moveable part and a cylinder part housing said piston to be moveable in the withdrawing direction of the tie bar.

8. A die clamping system as set forth in claim 1, wherein said withdrawing coupling part has a coupled part provided with coupled grooves opening in a direction perpendicular to the withdrawing direction of said tie bar and a coupling part a plate member arranged so as to be perpendicular to the withdrawing direction of said tie bar and insertable in said coupled grooves and a plate driver inserting and ejecting said plate member to and from said coupled grooves.

* * * * *